Patented Nov. 17, 1936

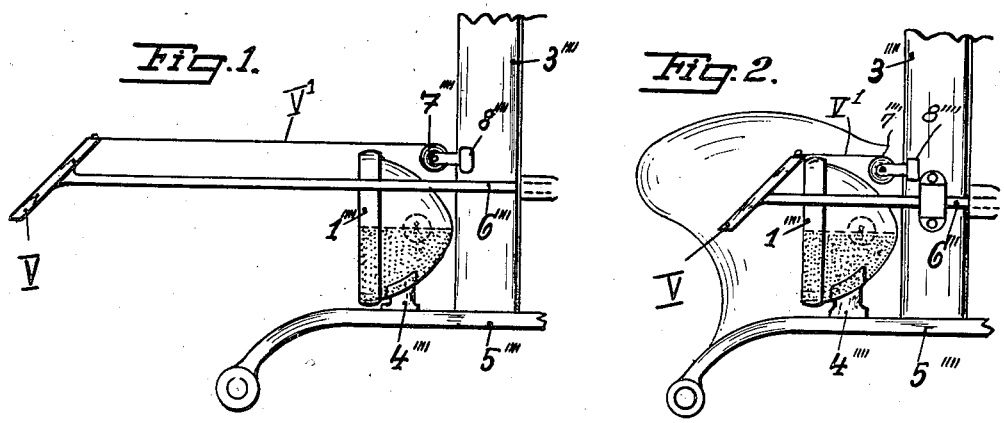

2,061,172

UNITED STATES PATENT OFFICE 2,061,172

DIMMING DEVICE

Hermann J. Schwabe, Chemnitz, Germany

Application June 25, 1932, Serial No. 619,293
In Germany March 5, 1932

3 Claims. (Cl. 240—45)

This invention relates to a dimming device for headlights of motor driven or other vehicles, and has for its object to provide for glare-free illumination of the roadway. The object of the invention is attained by the employment of external means which permanently extends from the level of the top of the headlight into the space in front of the headlight downwards to the level of the horizontal axial plane of the headlight only and is movable in a horizontal direction forwardly away from and rearwardly towards the said headlight.

According to a further feature of the invention this means is also connected with an arrangement for effectively preventing dazzling in foggy weather.

An embodiment of the invention is illustrated in the accompanying drawing in which Figure 1 is a side view of a dimming device shown in protracted position, and Figure 2 is a side view of the same dimming device shown in retracted position.

In the drawing a headlight 1'''' is arranged in front of the radiator of a motor car and secured to the frame 5'''' by the bearing 4''''. The dimming and fog protection device comprises a screen V which may be transversely disposed to the direction of the headlight axis in a vertical, oblique or similar position, which, further, by the rod 6'''' or the like, is movable along a horizontal path in the space in front of the headlights and which covers the upper half of the reflector down to the central plane of the headlight against dazzling rays, so that this part lies in an umbra.

Since it is absolutely necessary when driving through fog layers to avoid illuminating the fog by parallel rays or rays that are directed upwardly protection against fog requires that the space which is open on top and disposed between the headlight 1'''' and the screen V be screened off also. This can be done, for example, by connecting a roller blind V' in various ways with the screen V. When not in use, the blind V' is automatically wound up on a roll 7'''' which is held by a bearing 8'''' whereby a combination dimming and fog protection device is produced.

The screening means shown may of course have any other suitable form. Furthermore, the dimming and fog protection device according to the invention may be rigidly disposed or arranged so as to permit of mechanical or manual actuation.

I claim:—

1. A dimming and fog protection device for the headlight of a vehicle, comprising an external light screen situated permanently in front of the headlight and extending from the level of the top of the headlight downwards to the level of the horizontal axial plane of the said headlight for cutting off the upper portion of the headlight beam after it has escaped from the headlight, in combination with means for sliding the said screen horizontally rearwards towards and forwards away from the said headlight and a spring roller blind connected to the upper extremity of the said light screen for screening off the space which occurs between the said extremity and the headlight when the said screen is slid forwards away from the headlight.

2. A dimming and fog protection device for the headlight of a vehicle, comprising a light screen situated externally of the headlight and depending permanently in front of the headlight from the level of the top of the said headlight to the level of the horizontal axial plane thereof, but no further, in combination with horizontal slide means for moving the screen away from and towards the headlight in the space lying horizontally in front of the said headlight, an automatic roller blind attached to the said screen for preventing the upward escape of light rays from between the said screen and the headlight, a reflector provided inside the headlight and means on the lower half of the said reflector for rendering the said half non-dazzling.

3. A dimming and fog protection device for the headlight of a vehicle, comprising in combination a light screen which is movable horizontally towards and away from the headlight in front of the upper half of the headlight, horizontally slidable rods situated at the sides of the headlight for supporting and moving the said screen, a blind connected at one end to the upper edge of the said screen for intercepting those parallel and upwardly directed headlight rays which are not intercepted by the said screen, a locally stationary automatic blind roller attached to the other end of the said blind for winding up the blind when the said screen is moved towards the said headlight.

HERMANN JOHS. SCHWABE.